UNITED STATES PATENT OFFICE.

SYLVESTER LEWIS, OF ROCHESTER, ASSIGNOR TO WM. J. WILLIAMS, OF NEW YORK, N. Y.

TREATING OILS AND FATS TO FORM COMPOSITIONS FOR ILLUMINATING AND OTHER PURPOSES.

Specification forming part of Letters Patent No. 43,156, dated June 14, 1864.

*To all whom it may concern:*

Be it known that I, SYLVESTER LEWIS, of Rochester, county of Monroe, and State of New York, have discovered a new and useful Improvement in the Manner of Treating Oils and Fats for Illuminating and other Purposes; and I do hereby declare that the following is a full, clear, and exact description thereof.

My present invention is an improvement on that for which Letters Patent of the United States were issued to me on the 10th day of June, A. D. 1862, and which were reissued on the 29th day of March, A. D. 1864; and the object of this invention, as in that before patented, is the production of an improved oil for illuminating, lubricating, and other purposes by the use and combination of unctuous oils or fats with the light oils from petroleum known as "benzole," "benzine," "naphtha," or "carbon spirits."

Any kind of unctuous oil, fish-oil, or animal fat—as lard or tallow—may be used, and with this I mix, as hereinafter set forth, benzole, benzine, or naphtha.

In my former patent the proportions mentioned for the production of such improved oil of the benzole, benzine, or naphtha, and of the oils or fats used were two parts of the former (more or less) with one of the latter. These were to be mixed at a temperature of about 100° Fahrenheit, after which they were to stand at a lower temperature—from 50° to 70°—while a separation of the solid and liquid portions took place, which required about twenty-four hours when rendered lard or solid fats were used; but when lard-oil or other expressed oils in place of solid fat was used the materials would not require heating while being mixed, and the separation of the lighter and heavier portions would take place in about one-tenth the time required when the solid fat was used. The lighter portions remain at the top, and, when drawn off, constitute a valuable oil for burning in lamps, while the heavier and denser portions make an excellent lubricator for machinery and other uses of like character.

The oleine of the fat or oil used, being acted upon or "cut" by the benzole, benzine, or naphtha, produces the liquid or lighter portion suitable for illuminating purposes, while the stearine and gummy portions of such oil or fat, taking up or combining with a part of such benzole, benzine, or naphtha, form such portion as is useful for lubricating purposes.

When it is for any reason desirable to produce at the same time, or by the same operation, the illuminating and lubricating products solid fats or ordinary oils should be made use of, and in such case the proportions of the oils or fats used and of the benzole, benzine, or naphtha may be about that mentioned in my former patent, and the treatment should be substantially the same as that set forth therein. If, however, it is desired to produce only an illuminating-fluid, it is much preferable to use only the liquid oil or oleine expressed from fats and oils, (which is mostly free from the stearine or heavy and gummy or animal parts of the fats or oils,) and the proportion or quantity of benzole, benzine, or naphtha which may be mixed with a given quantity of such oleine may be much increased. Only such a proportion of oleine is requisite as will "fix," so to speak, the volatile or explosive properties of the benzole, benzine, or naphtha, and also carbonize the benzole, benzine, or naphtha sufficiently so that the fluid shall possess requisite illuminating-power. Careful experiments have demonstrated that for illuminating purposes but one part of oleine is required for eight parts of benzole, benzine, or naphtha, and the product formed is a highly desirable burning-fluid, burning freely, giving a sufficiently rich light, and not too volatile. If a larger proportion of benzole, benzine, or naphtha is made use of, the illuminating-power of the fluid is weakened, and its volatility is also too great. If, on the other hand, the proportion of the oleine is enlarged, the richness of the light is increased beyond what is required, and the cost of the fluid is also increased. Subject to these—the increase in cost of production and unnecessarily increasing the richness of light—the oleine and benzole, benzine, or naphtha may be mixed in different proportions between the extremes mentioned; but when a burning-fluid only is to be produced and oleine alone is used, I consider the best proportions to be about eight parts of benzole, benzine, or naphtha to one part of oleine.

The benzole, benzine, or naphtha referred to is not that produced from gas-tar, but that produced from the distillation of petroleum and commonly known as "benzole," "benzine," or "naphtha."

The burning-fluid may be colored by a little anatto, as set forth in my former patent.

What I claim as my invention, and desire to secure by Letters Patent, is—

The treatment of oleine expressed from fats and oils with benzine, benzole, or naphtha, substantially in the proportions and on the principles set forth.

SYLVESTER LEWIS.

Witnesses:
W. J. WILLIAMS,
S. D. LAW.